United States Patent Office 3,828,073
Patented Aug. 6, 1974

3,828,073
4-HYDROXY - 2H - 1 - BENZOTHIOPYRAN-3-CARBOXAMIDES AND THEIR CORRESPONDING S-OXIDES
Harold Zinnes, Rockaway, and Neil A. Lindo, Chatham, N.J., assignors to Warner-Lambert Company, Morris Plains, N.J.
No Drawing. Filed Mar. 23, 1973, Ser. No. 344,381
Int. Cl. A61k 27/00; C07d 65/14
U.S. Cl. 260—327 TH   3 Claims

ABSTRACT OF THE DISCLOSURE

Compounds having the following structural formula are disclosed:

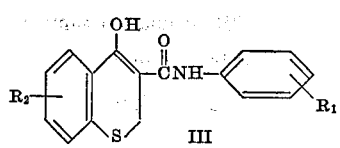

In the above formula $R_1$ and $R_2$ are hydrogen, alkyl, aryl, aralkyl, alkoxy, halogen, cyano, nitro, trifluoromethyl and the like. Also disclosed are their corresponding S-oxides. These compounds are useful as anti-inflammatory agents.

---

The present invention is concerned with novel compositions of matter. More particularly the present invention is concerned with 4-hydroxy-2H-1-benzothiopyran-3-carboxamides having the formula:

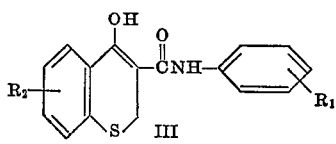

wherein $R_1$ and $R_2$ are hydrogen, alkyl, aryl, aralkyl, alkoxy, halogen, cyano, nitro, trifluoromethyl and the like. Also included within the scope of the present invention are the corresponding S-oxides having the formula:

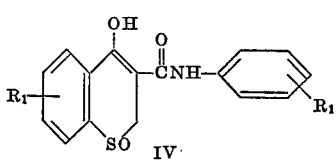

in which $R_1$ and $R_2$ are as defined.

The compounds of this invention, including the S-oxides thereof, are useful as anti-inflammatory agents for mammals, e.g., cats, dogs, monkeys and the like. For example, when they are administered orally or intraperitoneally to laboratory animals such as rats, at a dose of 25–200 mg./kg., they reduce the swelling in the paw which had been previously induced by injection of an irritant such as carrageenin.

These compounds are indicated in conditions where the soft tissues are inflammed, such a rheumatoid arthritis in mammals. A dose of 25–200 mg. kg. in several divided doses daily, orally or by injection, is recommended. This dose regimen may be varied depending on the weight, age, sex and the species of the mammal being treated.

In order to use these compounds, they are formulated with pharmaceutical diluents such as lactose and compounded into dosage forms such as tablets. Alternatively, they can be formulated with a sterile vehicle such as water for injection and compounded into suspensions suitable for parenteral administration.

According to the process of the invention, a β-ketoester of structure I where $R_3$ is alkyl or aryl is made to undergo aminolysis with an aniline derivative of structure II in a solvent such as xylene to give structure III. Reaction of III with an oxidizing agent such as m-chloroperbenzoic acid results in oxidation of the sulfide to the sulfoxide IV.

The foregoing process is illustrated as follows:

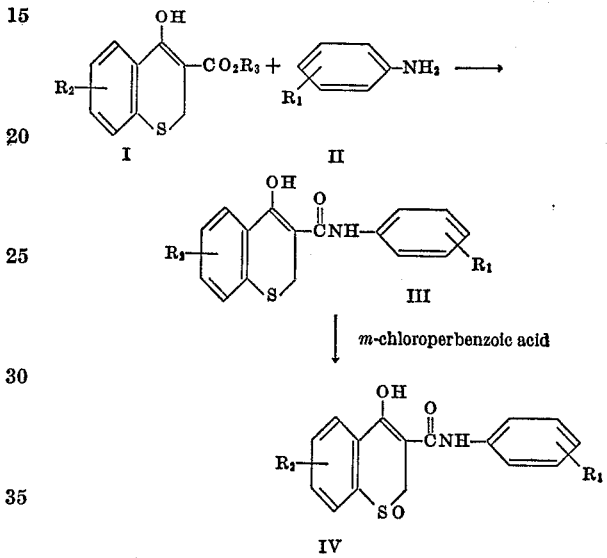

The starting compounds I are prepared as described by T. Moriwake, J. Med. Chem., 9, 163 (1966).

The compounds of this invention are acidic and therefore they form salts with alkalis. For example, the compounds of this invention are treated with alkali hydroxides such as sodium or potassium hydroxide to form the corresponding alkali metal salts. These salts are also within the scope of this invention.

To further illustrate the practice of this invention, the following examples are included.

EXAMPLE 1

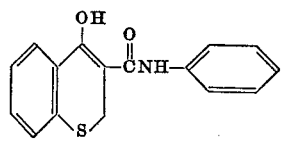

4 - Hydroxy - 2H - 1 - benzothiopyran - 3 - carboxanilide.—A mixture of 8.0 g. (0.036 mol) of methyl 4-hydroxy - 2H - 1 - benzothiopyran - 3 - carboxylate, 5 g. (0.054 mol) of aniline, and 150 ml. of toluene was refluxed under a nitrogen atmosphere in a Soxhlet apparatus, the thimble of which contained 2.0 g. of Linde type 4A molecular sieve. The mixture was cooled to room temperature and the resulting precipitate was collected and recrystallized to give 5.0 g. of product; mp 128–131.5°.
Anal. Calcd. for $C_{16}H_{13}NO_2S$: C, 67.82; H, 4.62; N, 4.94; S, 11.32. Found: C, 67.75; H, 4.72; N, 5.00; S, 11.30.

EXAMPLE 2

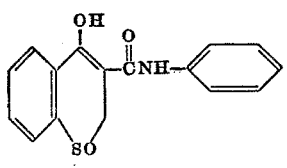

4 - Hydroxy - 2H - 1 - benzothiopyran - 3 - carboxanilide-1-oxide.—A solution of 4.25 g. (0.015 mol) of 4-hydroxy-2H-1-benzothiopyran-3-carboxanilide in 100 ml. of chloroform was treated dropwise with a solution of 3.05 g. (0.015 mol) of 85% m-chloroperbenzoic acid in 100 ml. of chloroform, the temperature being maintained at 18–25° during the addition. The mixture was stirred at room temperature for 18 hr. and the resulting precipitate (3.6 g.) was collected. The filtrate was evaporated to dryness and the residue was triturated with methanol to give 1.3 g. of additional crude product. The two fractions were combined and recrystallized from ethanol to give 2.7 g. of material; mp 170.5–173.5° dec.

Anal. Calcd. for $C_{16}H_{13}NO_3S$: C, 64.20; H, 4.38; N, 4.68; S, 10.71. Found: C, 64.00; H, 4.50; N, 4.70; S, 10.88.

We claim:
1. A compound of the formula:

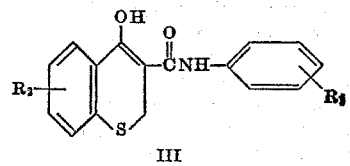

III wherein $R_1$ and $R_2$ are hydrogen; the S-oxides and the alkali metal salts thereof.

2. A compound according to Claim 1 which is 4-hydroxy-2H-1-benzothiopyran-3-carboxanilide.

3. A compound according to Claim 1 which is 4-hydroxy-2H-1-benzothiopyran-3-carboxanilide-1-oxide.

References Cited
UNITED STATES PATENTS 3,769,292   10/1973   Zinnes et al. _____ 260—294.8 C JOHN D. RANDOLPH, Primary Examiner C. M. S. JAISLE, Assistant Examiner U.S. Cl. X.R.

424—275